US012398347B2

(12) United States Patent
Sands

(10) Patent No.: US 12,398,347 B2
(45) Date of Patent: Aug. 26, 2025

(54) PARTS-WASHING METHOD

(71) Applicant: Terrafend Limited, Maidenhead (GB)

(72) Inventor: Tom Sands, Maidenhead (GB)

(73) Assignee: Terrafend Limited, Maidenhead (GB)

(*) Notice: Subject to any disclaimer, the term of this patent is extended or adjusted under 35 U.S.C. 154(b) by 0 days.

(21) Appl. No.: 18/318,532

(22) Filed: May 16, 2023

(65) Prior Publication Data

US 2023/0374422 A1 Nov. 23, 2023

Related U.S. Application Data

(63) Continuation of application No. 16/769,221, filed as application No. PCT/GB2018/053519 on Dec. 5, 2018, now abandoned.

(30) Foreign Application Priority Data

Dec. 5, 2017 (GB) ..................................... 1720206

(51) Int. Cl.
*C11D 17/00* (2006.01)
*B08B 3/00* (2006.01)
(Continued)

(52) U.S. Cl.
CPC .......... *C11D 17/0008* (2013.01); *B08B 3/003* (2013.01); *B08B 3/02* (2013.01);
(Continued)

(58) Field of Classification Search
CPC ....... C11D 11/0076; C11D 1/72; C11D 1/825; C11D 1/83; C11D 11/0029; C11D 11/007;
(Continued)

(56) References Cited

U.S. PATENT DOCUMENTS 4,609,488 A 9/1986 Geke et al.
5,296,150 A 3/1994 Taylor, Jr.
(Continued)

FOREIGN PATENT DOCUMENTS

CA 2932309 6/2015
CN 1027451 C 1/1995
(Continued)

OTHER PUBLICATIONS

Chinese Office Action of Application No. 2018800786557 dated Mar. 18, 2021, 11 pages.
(Continued)

*Primary Examiner* — Sharidan Carrillo
(74) *Attorney, Agent, or Firm* — Squire Patton Boggs (US) LLP

(57) ABSTRACT

A parts-washing method is described. The method comprises: (a) contacting a part with an aqueous liquid cleaning composition in a contact zone at a temperature of less than 45 degrees C., wherein the aqueous liquid cleaning composition comprises at least one alkoxylate surfactant; (b) passing at least part of the aqueous liquid cleaning composition from the contact zone to a separation housing; (c) separating the aqueous liquid cleaning composition in the separation housing to form an upper oily phase, an intermediate aqueous phase and a lower particulate phase; and (d) withdrawing at least a portion of the intermediate aqueous phase for use as the aqueous liquid cleaning composition in the contact zone.

20 Claims, 2 Drawing Sheets

(51) Int. Cl.

| | |
|---|---|
| ***B08B 3/02*** | (2006.01) |
| ***B08B 3/08*** | (2006.01) |
| ***B08B 3/10*** | (2006.01) |
| ***B08B 3/12*** | (2006.01) |
| ***B08B 3/14*** | (2006.01) |
| ***C11D 1/72*** | (2006.01) |
| ***C11D 1/825*** | (2006.01) |
| ***C11D 1/83*** | (2006.01) |

(52) U.S. Cl.
CPC ................ *B08B 3/08* (2013.01); *B08B 3/102* (2013.01); *B08B 3/12* (2013.01); *B08B 3/14* (2013.01); *C11D 1/72* (2013.01); *C11D 1/825* (2013.01); *C11D 1/83* (2013.01); *C11D 2111/16* (2024.01); *C11D 2111/46* (2024.01); *C11D 2111/48* (2024.01)

(58) Field of Classification Search
CPC ....... C11D 17/0008; B08B 3/003; B08B 3/02; B08B 3/08; B08B 3/102; B08B 3/12; B08B 3/14
See application file for complete search history.

(56) References Cited

U.S. PATENT DOCUMENTS

| | | | | |
|---|---|---|---|---|
| 5,614,027 | A | 3/1997 | Dunn et al. | |
| 5,712,236 | A | 1/1998 | Bolkan et al. | |
| 5,736,495 | A | 4/1998 | Bolkan et al. | |
| 5,834,411 | A | 11/1998 | Bolkan et al. | |
| 2002/0017493 | A1 | 2/2002 | Ehrnsperger et al. | |
| 2003/0040456 | A1 | 2/2003 | Imai et al. | |
| 2004/0014624 | A1 | 1/2004 | Bolkan et al. | |
| 2005/0035037 | A1 | 2/2005 | Lindsey et al. | |
| 2005/0256025 | A1 * | 11/2005 | Chernin | C23F 3/02 510/490 |
| 2021/0189299 | A1 | 6/2021 | Sands | |
| 2023/0374422 | A1 * | 11/2023 | Sands | B08B 3/003 |

FOREIGN PATENT DOCUMENTS

| | | | |
|---|---|---|---|
| CN | 1392805 | A | 1/2003 |
| CN | 104001702 | A | 8/2014 |
| CN | 104291542 | A | 1/2015 |
| CN | 106191890 | A | 12/2016 |
| EP | 0466054 | A2 | 1/1992 |
| EP | 0750532 | A1 | 1/1997 |
| JP | 1992122480 | A | 4/1992 |
| JP | H04122480 | A | 4/1992 |
| JP | H07-195044 | A | 8/1995 |
| JP | H09188897 | A | 7/1997 |
| JP | 2006-511671 | A | 4/2006 |
| JP | 2006-219552 | A | 8/2006 |
| JP | 2007-301529 | A | 11/2007 |
| WO | WO 9525606 | A1 | 9/1995 |
| WO | WO 97/014778 | A1 | 4/1997 |
| WO | WO 2000/029535 | A1 | 5/2000 |
| WO | WO 2004/061069 | A1 | 7/2004 |

OTHER PUBLICATIONS

Combined Search and Examination Report under Sections 17 and 18(3) for Application No. GB1720206.0, dated Apr. 27, 2018; 6 pages.

International search report and written opinion of PCT/GB2018/053519 dated Feb. 14, 2019; 14 pages.

Office Action of JP Patent Application No. 2020-531534 dated Dec. 6, 2022, with the Office Action Summary in English, 7 pages.

Office Action from Japanese Patent Application No. 10-2020-7015971, issued Mar. 25, 2024.

* cited by examiner

PARTS-WASHING METHOD

CROSS-REFERENCE TO RELATED APPLICATIONS

This application is a continuation of U.S. application Ser. No. 16/769,221, filed Jun. 2, 2020, which is a national-stage filing under 37 USC 371 (c) of International Application No. PCT/GB2018/053519, file Dec. 5, 2018, which claims priority to, and the benefit of, GB1720206.0, filed Dec. 5, 2017, the entire contents of each of which are herein incorporated by reference in their entirety for all purposes.

BACKGROUND

A parts washer is an apparatus used to remove contaminants, for example, dirt, grime, carbon deposits, oil, grease, ink, paint, and corrosion from workpieces. Parts washers are used in manufacturing, maintenance and repair processes. Parts washers may be used in, for example, garages, workshops and factories to clean parts for, for example, assembly, inspection, surface treatment, packaging, re-use and/or distribution.

Various types of parts washers exist. For example, some parts washers employ organic solvents. Organic solvents may be effective at removing oils, grease and dirt during the washing process. However, they tend to be volatile and can present safety concerns, particularly when used in confined spaces. Moreover, the disposal of spent organic solvent may give rise to environmental concerns.

More recently, parts washers have been developed, which rely on the use of aqueous cleaning compositions. In such parts washers, a part(s) is contacted with an aqueous cleaning composition at elevated temperature of at least 65 degrees C. Elevated temperatures are considered necessary for effective cleaning. Oily components from the part are emulsified by the aqueous cleaning composition forming an oil-in-water emulsion, which may be re-circulated and re-used several times before disposal.

BRIEF DESCRIPTION OF THE DRAWINGS

Embodiments of the invention are further described hereinafter with reference to the accompanying drawings, in which.

DETAILED DESCRIPTION

Figure 1:
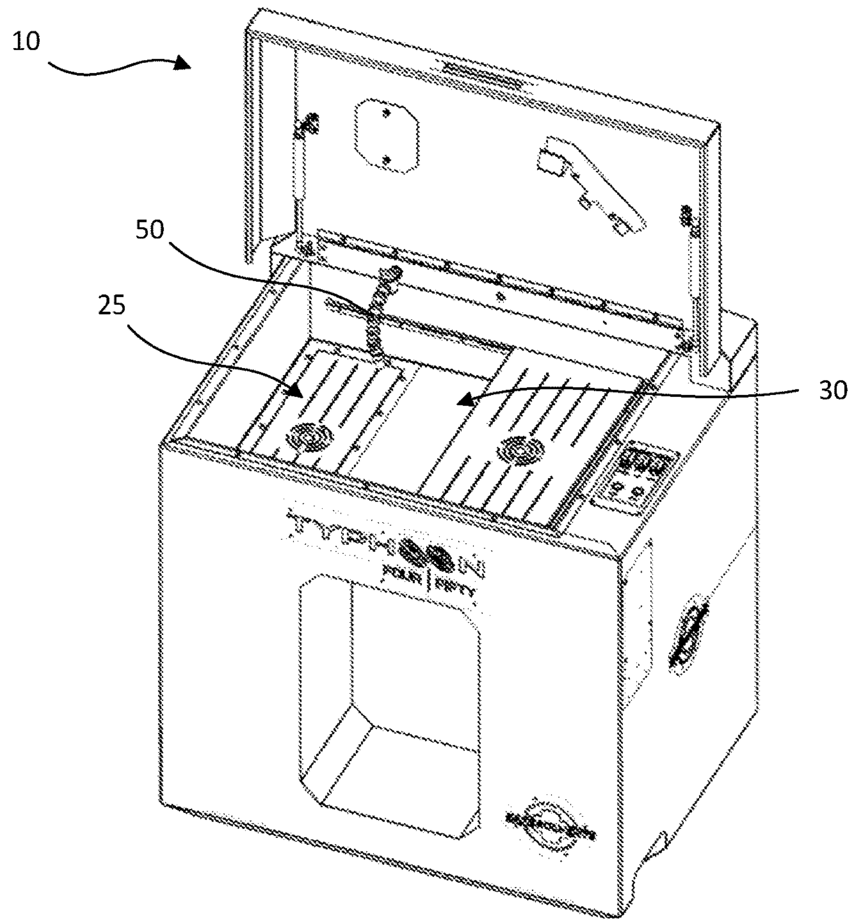
FIG. 1 is a 3-dimensional view of the parts washer for use in a method according to one embodiment of the present invention.

In a first aspect of the present disclosure, there is provided a parts-washing method comprising:

a) contacting a part with an aqueous liquid cleaning composition in a contact zone at a temperature of less than 45 degrees C., wherein the aqueous liquid cleaning composition comprises at least one alkoxylate surfactant;

b) passing at least part of the aqueous liquid cleaning composition from the contact zone to a separation housing;

c) separating the aqueous liquid cleaning composition in the separation housing to form an upper oily phase, an intermediate aqueous phase and a lower particulate phase; and d) withdrawing at least a portion of the intermediate aqueous phase for use as the aqueous liquid cleaning composition in the contact zone.

In the parts-washing method of the present disclosure, a part (or parts) is contacted with an aqueous liquid cleaning composition at a temperature of less than 45 degrees C. This contrasts with part-washing methods of the prior art, where aqueous liquid cleaning compositions are heated to temperatures of at least 65 degrees prior to use.

The aqueous liquid cleaning composition may be used to remove contaminants from the part to be cleaned. For example, soluble contaminants may dissolve in the aqueous liquid cleaning composition, while other contaminants may be emulsified, dispersed or suspended in the aqueous liquid cleaning composition.

The spent aqueous liquid cleaning composition may be removed from the contact zone and passed to a separation housing. In the separation housing, the aqueous liquid cleaning composition may be allowed to settle under gravity. This separation causes the aqueous liquid cleaning composition to separate to form an upper oily phase, an intermediate aqueous phase and a lower particulate phase.

Preferably, the separation step occurs at a temperature of less than 45 degrees C. Thus, the separation may be carried out at e.g. the ambient temperature of the surroundings and/or without heating. Advantageously, separation may be facilitated under temperature conditions of e.g. less than 45 degrees. Such temperature conditions may facilitate the coalescence of oil droplets dispersed in the aqueous liquid cleaning composition to form an upper oily phase. This contrasts with prior art methods, in which oil is retained in the cleaning composition as a dispersion or emulsion. In some embodiments, the contacting step and separation steps occur within 10 degrees C., preferably within 5 degrees C., more preferably within 2 degrees C. of on another. In some embodiments, the contacting step and separation steps occur at substantially the same temperature.

In the method of the present disclosure, at least a portion of the intermediate aqueous phase in the separation housing is withdrawn for use as the aqueous liquid cleaning composition in the contact zone. By separating oils and particulates from the aqueous phase in the separation housing, the contaminant level within the intermediate aqueous phase may be kept relatively low. This can prolong the longevity of the composition, allowing the aqueous liquid cleaning composition to maintain its efficacy for longer. Accordingly, the composition may be re-circulated and re-used a plurality of times before having to be replaced.

Contact Zone

As discussed above, step a) of the method of the present disclosure involves contacting a part to be cleaned with an aqueous liquid cleaning composition in a contact zone. The contacting step occurs at temperatures of less than 45 degrees C. Preferably, the part is contacted with the aqueous liquid cleaning composition in the contact zone at a temperature of 10 to 35 degrees C. For example, the part may be contacted with the aqueous liquid composition at a temperature of 15 to 30 degrees C., for instance, 20 to 25 degrees C. The aqueous cleaning composition may be contacted with the part at the ambient temperature of the surroundings. Preferably, the aqueous cleaning composition is not heated prior to contact with the part in the contact zone. An advantage of embodiments of the present disclosure is that effective cleaning may be achieved under relatively mild temperature conditions.

Any suitable contact zone may be employed. For example, the contact zone may comprise a contact reservoir. A part to be cleaned may be positioned within the reservoir, while the aqueous liquid cleaning composition is directed onto the part, for example, using a tap or nozzle. Where a nozzle is employed, the aqueous liquid cleaning composition may be delivered at pressure, for example, together with compressed gas (e.g. air). The nozzle may be used to deliver the aqueous liquid cleaning composition at pressures of up to 2000 psi, for example, 500 to 1800 psi. In some embodiments, the pressure may be used to deliver the composition as a foam.

During the contacting step, the part may be scrubbed, for example, manually to facilitate cleaning. The contact reservoir may comprise an outlet through which spent aqueous liquid cleaning composition may be withdrawn and transferred to the separation housing.

In an alternative embodiment, the contact reservoir may comprise a soaking bath or tank. For example, the soaking bath may be at least partially filled with the aqueous liquid cleaning composition. A part to be cleaned may be immersed or partly immersed in the aqueous liquid cleaning composition and, for example, allowed to soak for a length of time. During this soaking step, the part may be scrubbed, for example, manually.

Alternatively, or additionally, the aqueous liquid cleaning composition may be agitated, for example, mechanically to induce shear forces around the part to be cleaned. In another embodiment, ultrasonic waves are propagated through the aqueous liquid cleaning composition to enhance the cleaning effect.

Where ultrasound is used, ultrasound may be propagated at a frequency of 20 to 60 kHz, for example, 28 to 40 kHz. The ultrasound may be propagated at a power of 1000 to 10,000 W, for example 2000 to 6000 W.

In an alternative embodiment, the contact reservoir may take the form of a contact chamber. A nozzle may be positioned within the contact chamber. In one embodiment, the nozzle is configured to fit into an opening of the part to be cleaned. For example, where the part comprises a spray gun for, for example, spray paint, the nozzle may be configured to fit into the outlet of the spray gun to direct aqueous liquid cleaning composition into the interior of the gun.

In yet another embodiment, the contact chamber may be a jet-wash chamber, where the liquid aqueous cleaning composition is delivered through a spray nozzle under pressure. Preferably, the liquid aqueous cleaning composition is delivered as a foam. The foam may have the requisite stiffness and mechanical integrity to provide an enhanced cleaning effect. The foam may be generated by delivering the composition under pressure. Used foam may collect at the base of the contact chamber, where it preferably collapses and drains through an outlet at the base of the chamber as a liquid.

Separation

As mentioned above, at least part of the aqueous liquid cleaning composition is passed from the contact zone to a separation housing in step b). The aqueous liquid cleaning composition may be withdrawn through an outlet(s) in the contact zone, for example, under gravity. The aqueous liquid cleaning composition is then separated in the separation housing in step c) to form an upper oily phase, an intermediate aqueous phase and a lower particulate phase. The aqueous liquid cleaning composition may be transferred from the contact zone to the separation housing under gravity and/or using a pump.

In the separation housing, the aqueous liquid cleaning composition may be allowed to settle under gravity. This separation causes the aqueous liquid cleaning composition to separate to form an upper oily phase, an intermediate aqueous phase and a lower particulate phase.

Preferably, the separation step occurs at a temperature of less than 45 degrees C. Thus, the separation may be carried out at e.g. the ambient temperature of the surroundings and/or without heating. Preferably, the separation is carried out at a temperature of 10 to 35 degrees C., more preferably 15 to 30 degrees C., for instance, 20 to degrees C. In some embodiments, the contacting step and separation steps occur within 10 degrees C., preferably within 5 degrees C., more preferably within 2 degrees C. of on another. In some embodiments, the contacting step and separation steps occur at substantially the same temperature.

Re-Use

Once the aqueous liquid cleaning composition is separated into the upper oily phase, intermediate aqueous phase and lower particulate phase, the intermediate aqueous phase may be withdrawn and re-used in the contacting step. Preferably, the intermediate aqueous phase may be filtered prior to re-use.

In one embodiment, the separation housing may be provided with an outlet for withdrawal of the intermediate aqueous phase. The outlet may be positioned in a wall of the separation housing. The outlet may be positioned at a height that allows the intermediate aqueous phase to be withdrawn with, for example, a reduced risk of contamination with the lower particulate phase or oily phase.

In one embodiment, a filter may be placed in or adjacent the outlet in the housing. For example, the separation housing may comprise a filter housing for containing the filter. The intermediate aqueous phase may be withdrawn through the outlet of the separation housing and passed through the filter in the filter housing prior to being re-used in the contact zone.

The intermediate aqueous phase may be transferred to the contact zone using, for example, a pump.

Where a filter is used, the filter may comprise a porous substrate (e.g. a porous foam substrate). The porous substrate may comprise 15 to 45 pores per inch (ppi), for example, 30 pores per inch. The porous substrate may be positioned between perforated sheets of, for example, stainless steel mesh. The intermediate aqueous phase may be passed through the filter so that any suspended particles are removed prior to re-use. This may be important in embodiments where the intermediate aqueous phase is pumped from the separation housing to the contact zone, as suspended particles may be detrimental to the function of the pump.

The lower particulate phase may be removed from the separation housing. In one embodiment, the separation housing comprises a base portion and an outlet, said base portion being configured to facilitate withdrawal of the lower particulate phase through the outlet. In one embodiment, the base portion may be angled, for example, direct the lower particulate phase towards the outlet. A waste collection unit may be placed in fluid communication with the outlet, allowing the lower particulate phase to be collected. The collected lower particulate phase may be disposed of, as required.

With prolonged use, the aqueous liquid cleaning composition may need to be replaced with a fresh composition. To do so, the contents of the separation housing may need to be remove. The upper oily phase may be removed, for instance, by skimming. Any lower particulate phase separated in the waste collection unit may be disposed of. The remaining intermediate aqueous phase may also be disposed or, alternatively, used as a cleaning liquid for alternative applications. Fresh aqueous liquid cleaning composition may then be introduced into the separation housing.

Each batch of fresh aqueous liquid composition may be re-used for a prolonged period of time, for example, 1 to 30 weeks, preferably 2 to 20 weeks, most preferably 4 to 12 weeks.

Parts

Any suitable part may be washed in the method of the present disclosure. For the avoidance of doubt, one or more parts may be contacted with the aqueous liquid cleaning composition in the contact zone at a given time. Examples of suitable parts include work pieces. Suitable parts may be formed at least in part of metal. Examples of suitable parts include machine parts, automotive and other vehicle parts, spray guns and engine blocks. Specific examples include gear boxes, bearings, drive chains, callipers, drum discs, cogs, nuts, bolts and washers.

Cleaning Composition

The cleaning composition employed in the method of the present disclosure comprises at least one alkoxylate surfactant. Preferably, the composition comprises a blend of alkoxylate surfactants. In some examples, the composition comprises at least two alkoxylate surfactants. The total amount of alkoxylate surfactant(s) in the composition may be 1 to 20 weight %, for example, 2 to 10 weight %, preferably 3 to 8 weight % based on the total weight of the composition.

Any suitable alkoxylate surfactant may be employed. An example of a class of non-ionic surfactants is ethoxylated non-ionic surfactants prepared by the reaction of a monohydroxy alkanol or alkylphenol with 2 to 20 carbon atoms. Preferably the surfactants have at least 1 mole of ethylene oxide per mole of alcohol or alkylphenol.

In some embodiments, the surfactant may be a linear chain fatty alcohol with 16-carbon atoms and at least 12 moles, particularly preferred at least 16 and still more preferred at least 20 moles, of ethylene oxide per mole of alcohol. The surfactant additionally may comprise propylene oxide units in the molecule. Preferably these PO units constitute up to 25% by weight, preferably up to 20% by weight and still more preferably up to 15% by weight of the overall molecular weight of the non-ionic surfactant.

Surfactants which are ethoxylated mono-hydroxy alkanols or alkylphenol, which additionally comprises polyoxyethylene-polyoxypropylene block copolymer units may also be used. The alcohol or alkylphenol portion of such surfactants may constitute more than 30% by weight, preferably more than 50% by weight, more preferably more than 70% by weight of the overall molecular weight of the non-ionic surfactant. Another class of suitable surfactants includes reverse block copolymers of polyoxyethylene and polyoxypropylene and block copolymers of polyoxyethylene and polyoxypropylene initiated with trimethylolpropane.

Another suitable class of surfactant can be described by the formula: $R^1O[CH_2CH(CH_3)O]_x[CH_2CH_2O]_y[CH_2CH(OH)R^2]$, where $R^1$ represents a linear or branched chain aliphatic hydrocarbon group with 4-18 carbon atoms or mixtures thereof, $R_2$ represents a linear or branched chain aliphatic hydrocarbon group with 2-26 carbon atoms or mixtures thereof, x is a value between 0.5 and 1.5 and y is a value of at least 15.

Preferably, the alkoxylate is an ethoxylated surfactant. Suitable examples include alkoxylated surfactants prepared by the alkoxylation (e.g. ethoxylation) of an alcohol. Examples of suitable alcohols include alcohols of the formula R—OH, wherein R is an alkyl group having 1 to 30 carbon atoms, preferably 2 to 20 carbon atoms, more preferably 5 to carbon atoms or 9 to 11 carbon atoms. The alkyl group may be a linear alkyl group.

The alcohol may be alkoxylated (e.g. ethoxylated) with 1 to 15 moles of alkylene oxide (e.g. ethylene oxide) per mole of alcohol, for example, 2 to 10 moles of alkylene oxide (e.g. ethylene oxide) per mole of alcohol, preferably 2 to 8 moles of alkylene oxide (e.g. ethylene oxide) per mole of alcohol.

In one embodiment, the cleaning composition comprises at least two ethoxylated alcohol surfactants. The ethoxylated alcohol surfactants may each be an ethoxylated $C_6$ to $C_{20}$ alcohol, preferably a $C_8$ to $C_{15}$ alcohol. The molar amount of ethylene oxide per mole of alcohol in each of the ethoxylated alcohol surfactants may be different. However, each alcohol may be ethoxylated with 2 to 8 moles of ethylene oxide per mole of alcohol.

The cleaning composition may further comprise an anionic surfactant. Any suitable anionic surfactant may be employed. Examples include linear alkylbenzene sulfonates, alcohol ether sulphates, secondary alkane sulphates and alcohol sulphates. Other examples include sulfosuccinates, for instance, dioctyl sodium sulfosuccinate. Other examples include sarcosinates, for instance, sodium lauroyl sarcosinate. The anionic surfactant, when present, may be used in an amount of 0.1 to 5 weight %, preferably 1 to 3 weight % of the composition.

Where an anionic surfactant is present, the weight ratio of the total amount of anionic surfactant to the total amount of alkoxylate may be less than 1. For example, the weight ratio of the total amount of anionic surfactant to the total amount of alkoxylate may be 1:1 to 1:10, preferably 1:2 to 1:8.

The cleaning composition comprises water. Water may be present in an amount of at least 50 weight %, preferably at least 60 weight %, more preferably at least 70 weight %, and yet more preferably at least 75 weight % or 80 weight % of the composition.

The cleaning composition may further include an organic co-solvent, for example, a glycol ether or alcohol co-solvent. However, where an organic co-solvent is used, the organic co-solvent is used in an amount of less than 15 weight %, preferably less than 10 weight %. In one embodiment, the cleaning composition comprises 0 to 10 weight % of a glycol ether solvent.

Other optional components of the cleaning composition may include a chelating agent, a biocide and/or a solubilizing agent.

Figure 2:
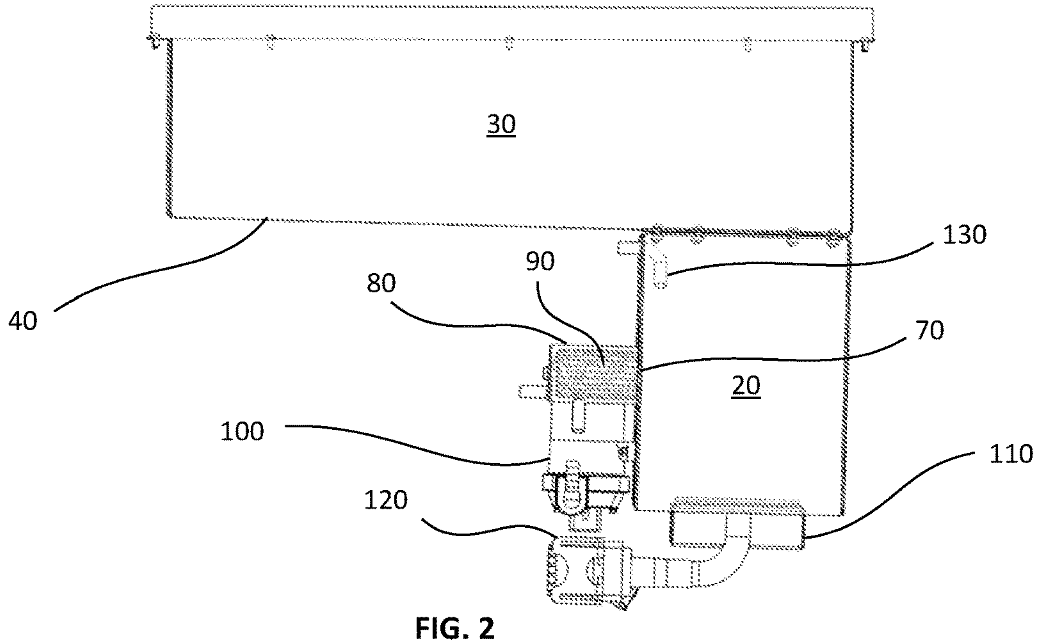
FIG. 2 is a schematic view of a cross-section through the parts washer shown in FIG. 1.
Figure 3:
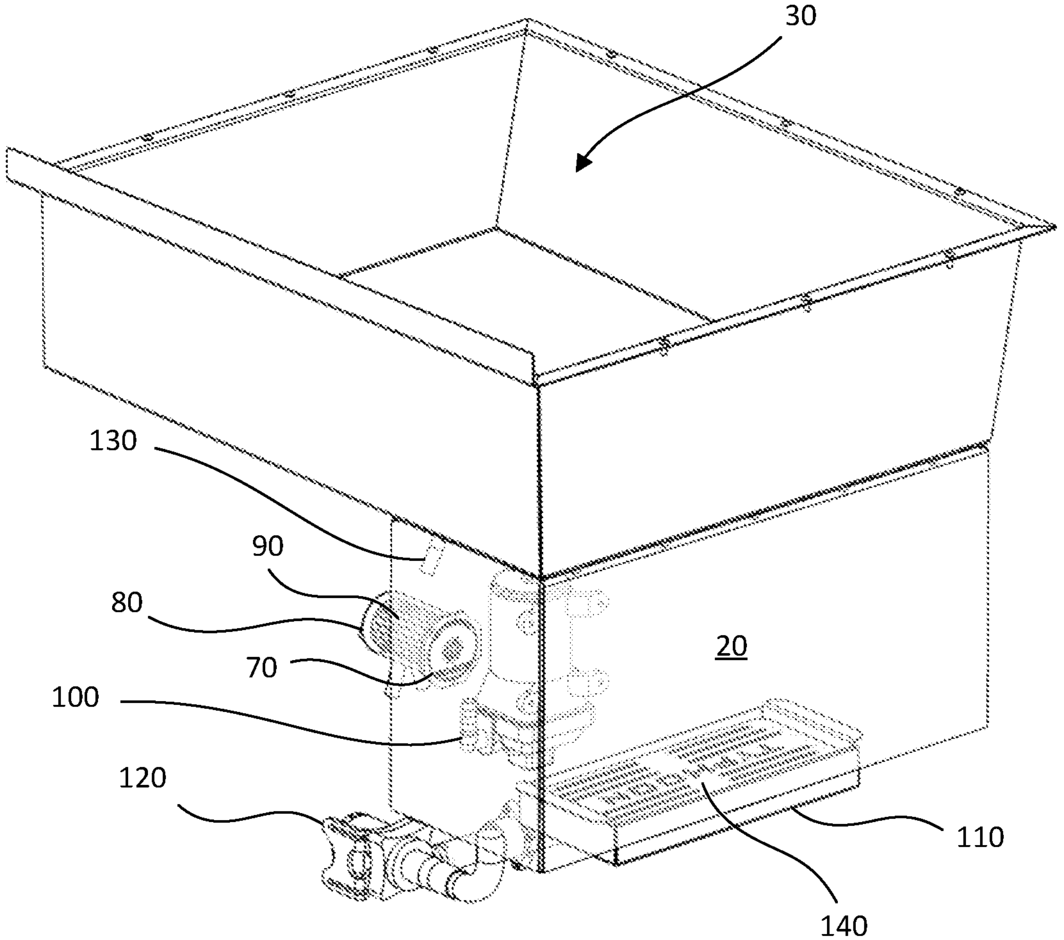
FIG. 3 is another illustration showing a further view of the parts washer of FIGS. 1 and 2.

Reference is now made to FIGS. 1, 2 and 3 of the drawings. FIGS. 1, 2 and 3 present different views of a parts washer for use in an embodiment of the method of the present invention.

Turning first to FIG. 1, this drawing provides a 3-dimensional view of the parts washer 10. The parts washer 10 comprises a contact zone in the form of a contact reservoir 30. The base 40 of the reservoir 30 is provided with drainage channels 25, which provide fluid communication with a separation housing located beneath the contact reservoir. The parts washer 10 comprises a nozzle 50.

Reference is made to FIGS. 2 and 3. FIG. 2 is a schematic sectional view of the parts washer 10 of FIG. 1, showing the contact reservoir 30 and the separation housing 20 in further detail. FIG. 3 is a 3-dimensional view of the contact reservoir 30 and separation housing 20 depicted in FIG. 2. As can be seen from FIG. 2, the base of the contact reservoir 30 is positioned at an angle to the horizontal. This facilitates drainage of liquid contained in the reservoir 30 through the drainage channels 25. As mentioned above, the separation housing 20 is in fluid communication with the drainage channels 25 and located beneath the reservoir 30.

An outlet 70 is provided in a side wall of the separation housing 20. The outlet 70 is in fluid communication with a filter housing 80. A filter 90 is positioned within the outlet 70 and extends into the filter housing 80. The filter housing 80 may be coupled to pump 100 via a connector. The pump 100 may be operable to pump liquid from the separation housing 20 through the filter 90, into the filter housing 80 and out through nozzle 50.

The base of the separation housing 20 may be in fluid communication with a waste collection unit 110. A pump 120 may also be provided, which may be operable to drain liquid contained in the separation unit 20 to waste.

In operation, the separation housing 20 may be filled with a fresh source of an aqueous liquid cleaning composition comprising at least one alkoxylate surfactant via conduit 130. Pump 100 may be operated to draw the liquid composition through the filter 90, into the filter housing 80 and out through the nozzle 50. The nozzle 50 may be directed onto a part to be cleaned, for example, an automotive part. Contact between the liquid composition and the part occurs within the contact reservoir 30. The liquid cleaning composition is not heated prior to contact with the part. Accordingly, the contacting step occurs at ambient temperature. The alkoxylated surfactant in the liquid composition helps to detach contaminants from the surface of the part. If desired, the part may be scrubbed to aid removal of e.g. grease and other contaminants from the surface of the part.

The used liquid composition containing oily and particulate contaminants from the part flows through drainage channels 25 and back into the separation housing 20. The separation housing 20 may be at ambient temperature. In the separation housing 20, the liquid composition separates to form an upper oily phase, an intermediate aqueous phase and a lower particulate phase in the separation housing 20. The lower particulate phase may accumulate in the waste collection unit 110 via drainage channels 140.

The outlet 70 is positioned to draw the intermediate aqueous phase from the separation housing 20. Thus, by operating the pump 100, the intermediate aqueous phase may be re-used to clean further metal parts in the contact reservoir 30. By tailoring the aqueous liquid cleaning composition and/or controlling the temperature of the separation step, oily components initially dissolved or dispersed in the liquid separate out as an upper oily phase, while particulate components separate as a lower particulate phase. By separating such oily and particulate components from the intermediate aqueous phase in this manner, the longevity of the intermediate aqueous phase can be improved, allowing the composition to be re-used for a greater number of cycles.

Eventually, however, the liquid composition may need to be replaced. This may be done by, for example, removing the upper oily phase from the separation housing 20 by skimming. The contents of the waste collection unit 110 may also be removed and disposed of. The pump 120 may then be operated to remove the contents of the separation housing 20 for disposal or re-use as a detergent formulation for other applications.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A parts-washing method comprising:

a) contacting a part with an aqueous liquid cleaning composition in a contact zone at a temperature of less than 45 degrees C., wherein the aqueous liquid cleaning composition comprises at least one alkoxylate surfactant and is not heated prior to contact with the part in the contact zone, wherein the at least one alkoxylate surfactant comprises an ethoxylated non-ionic surfactant prepared by a reaction of an ethylene oxide with a monohydroxy alkanol or an alkylphenol, wherein the monohydroxy alkanol or the alkylphenol each having 2 to 20 carbon atoms, and wherein a total amount of the at least one alkoxylate surfactant in the aqueous liquid cleaning composition is 1 weight % to 20 weight % based on a total weight of the aqueous liquid cleaning composition;

b) passing at least part of the aqueous liquid cleaning composition from the contact zone to a separation housing;

c) separating the aqueous liquid cleaning composition by allowing it to settle only under gravity in the separation housing to form a separated aqueous liquid cleaning composition having an upper oily phase, an intermediate aqueous phase and a lower particulate phase; and d) withdrawing at least a portion of the intermediate aqueous phase from the separated aqueous liquid cleaning composition in the separation housing, wherein the at least a portion of the intermediate aqueous phase is for use as the aqueous liquid cleaning composition in the contact zone.

2. A parts-washing method as claimed in claim 1, wherein the separation housing comprises a base portion and an outlet, said base portion being configured to facilitate withdrawal of the lower particulate phase through the outlet.

3. A parts-washing method as claimed in claim 1, which further comprises withdrawing the lower particulate phase for disposal.

4. A parts-washing method as claimed in claim 1, wherein the portion of the intermediate aqueous phase is filtered prior to use as the aqueous liquid cleaning composition in the contact zone.

5. A parts-washing method as claimed in claim 1, wherein the separation housing comprises a further outlet positioned to allow withdrawal of the intermediate aqueous phase for use as the aqueous liquid cleaning composition in the contact zone.

6. A parts-washing method as claimed in claim 1, wherein the aqueous liquid cleaning composition is delivered onto the part using a nozzle.

7. A parts-washing method as claimed in claim 1, wherein the contact zone comprises a soaking bath.

8. A parts-washing method as claimed in claim 1, wherein the aqueous liquid cleaning composition comprises at least two ethoxylated surfactants.

9. A parts-washing method as claimed in claim 1, wherein the part is contacted with the aqueous liquid cleaning composition in the contact zone at a temperature of 10 to 35 degrees C., and the aqueous liquid cleaning composition additionally comprises an anionic surfactant.

10. A parts-washing method as claimed in claim 1, wherein the part is contacted with the aqueous liquid cleaning composition in the contact zone at a temperature of 10 to 35 degrees C.

11. A parts-washing method as claimed in claim 1, wherein the separation step is carried out at a temperature of 10 to 35 degrees C.

12. A parts-washing method as claimed in claim 1, wherein the part comprises a metal part.

13. A parts-washing method as claimed in claim 1, wherein steps a) to d) are repeated for a plurality of cycles.

14. A parts-washing method as claimed in claim 1, wherein the separation step is carried out at a temperature of 10 to 30 degrees C.

15. A parts-washing method as claimed in claim 1, wherein the contacting a part with an aqueous liquid cleaning composition and the separating the aqueous liquid cleaning composition occur at temperatures within 5 degrees C. of one another.

16. A parts-washing method as claimed in claim 5, wherein a filter is positioned in or adjacent the further outlet.

17. A parts-washing method as claimed in claim 6, wherein the aqueous liquid composition is delivered as a foam.

18. A parts-washing method as claimed in claim 7, wherein the part and aqueous liquid cleaning composition are introduced into the soaking bath and ultrasonic waves are propagated through the aqueous liquid cleaning composition in the soaking bath.

19. A parts-washing method as claimed in claim 7, wherein the part and aqueous liquid cleaning composition are introduced into the soaking bath and the aqueous liquid composition is mechanically agitated.

20. A parts-washing method as claimed in claim 13, wherein, once steps a) to d) are repeated for a plurality of cycles, the separation housing is emptied and re-filled with a fresh source of the aqueous liquid cleaning composition before steps a) to d) repeated for a further plurality of cycles.

* * * * *